United States Patent
Yasuda

(10) Patent No.: US 11,319,472 B1
(45) Date of Patent: May 3, 2022

(54) POLYOLEFIN FILM AND RADIATIVE COOLING STRUCTURE BODY

(71) Applicant: FUJIFILM CORPORATION, Tokyo (JP)

(72) Inventor: Hideki Yasuda, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/558,535

(22) Filed: Dec. 21, 2021

Related U.S. Application Data

(63) Continuation of application No. PCT/JP2020/024195, filed on Jun. 19, 2020.

(30) Foreign Application Priority Data

Jun. 27, 2019 (JP) .............................. JP2019-120250

(51) Int. Cl.
```
C08J 5/18      (2006.01)
C09K 5/14      (2006.01)
F28F 21/06     (2006.01)
D04H 1/4291    (2012.01)
```
(52) U.S. Cl.
CPC ............... *C09K 5/14* (2013.01); *C08J 5/18* (2013.01); *D04H 1/4291* (2013.01); *F28F 21/067* (2013.01); *C08J 2323/06* (2013.01); *F28F 2245/00* (2013.01)

(58) Field of Classification Search
USPC ............... 442/417; 525/173, 174, 177, 180; 428/411.1, 412
See application file for complete search history.

(56) References Cited

U.S. PATENT DOCUMENTS

| | | |
|---|---|---|
| 2018/0030626 A1 | 2/2018 | Chen et al. |
| 2019/0008217 A1 | 1/2019 | Cui et al. |
| 2019/0184687 A1 | 6/2019 | Yasuda et al. |

FOREIGN PATENT DOCUMENTS

| | | |
|---|---|---|
| CN | 109624284 A | 4/2019 |
| JP | 2019-512053 A | 5/2019 |
| WO | 2018/062541 A1 | 4/2018 |

OTHER PUBLICATIONS

International Search Report issued in International Application No. PCT/JP2020/024195 dated Sep. 8, 2020.
Written Opinion of the ISA issued in International Application No. PCT/JP2020/024195 dated Sep. 8, 2020.

*Primary Examiner* — Terressa Boykin
(74) *Attorney, Agent, or Firm* — Solaris Intellectual Property Group, PLLC

(57) ABSTRACT

The present disclosure provides a polyolefin film including a fibrous polyolefin having an average diameter of 0.1 μm or more and less than 1.0 μm, wherein the polyolefin film has a connected-void structure, has a void ratio a of 50% to 90%, has a thickness d in μm, which satisfies, together with the void ratio a, a relation of $40 \leq (d \times (100-a)/100) \leq 200$, and is used as a radiative cooling film, and a radiative cooling structure body including the polyolefin film.

8 Claims, 1 Drawing Sheet

POLYOLEFIN FILM AND RADIATIVE COOLING STRUCTURE BODY

CROSS-REFERENCE TO RELATED APPLICATIONS

This application is a continuation application of International Application No. PCT/JP2020/024195, filed Jun. 19, 2020, which is incorporated herein by reference. Further, this application claims priority from Japanese Patent Application No. 2019-120250, filed Jun. 27, 2019, which is incorporated herein by reference.

BACKGROUND OF THE INVENTION

1. Field of the Invention

The present disclosure relates to a polyolefin film and a radiative cooling structure body.

2. Description of the Related Art

There has been a demand for a cooling technique suitable for the purpose of, for example, providing a comfortable temperature environment in the outdoors or storing foods etc. In particular, in outdoor environments without power sources, a cooling technique not using electricity is desired. Thus, a cooling technique using the radiative cooling phenomenon has been studied.

WO2018/062541A discloses a laminate structure sequentially including, from the cooling-target article side, a radiative cooling layer that contains a resin including bubbles and radiates far-infrared rays to cool the cooling-target article, and a heat insulating layer that contains a resin including bubbles, has a void ratio of 70% or more, and includes 8 or less bubbles in the layer thickness direction.

SUMMARY OF THE INVENTION

For the cooling technique using the radiative cooling phenomenon, there has been a demand for exertion of a stronger radiative cooling effect. However, in the cooling techniques having been proposed (for example, WO2018/062541A), there is room for improvement in achieving both of a high sunlight blocking ratio and a high infrared transmittance.

Under such circumstances, the present disclosure has been accomplished.

An object of an embodiment of the present disclosure is to provide a polyolefin film that has a strong radiative cooling effect.

An object of another embodiment of the present disclosure is to provide a radiative cooling structure body that has a strong radiative cooling effect.

The present disclosure includes the following embodiments.

<1> A polyolefin film including a fibrous polyolefin having an average diameter of 0.1 μm or more and less than 1.0 μm, wherein the polyolefin film has a connected-void structure, has a void ratio a of 50% to 90%, has a thickness d in μm, which satisfies, together with the void ratio a, a relation of $40 \leq (d \times (100-a)/100) \leq 200$, and is used as a radiative cooling film.

<2> The polyolefin film according to <1>, wherein, of the fibrous polyolefin, polyolefin fibers having a diameter of 2 μm or more have a volume ratio of, relative to a total volume of the polyolefin film, 10 vol % or less.

<3> The polyolefin film according to <1> or <2>, having a sunlight blocking ratio of 92% or more.

<4> The polyolefin film according to any one of <1> to <3>, having an infrared transmittance of 80% or more.

<5> The polyolefin film according to any one of <1> to <4>, being a polyethylene film.

<6> The polyolefin film according to any one of <1> to <5>, including high-refractive-index particles.

<7> The polyolefin film according to <6>, wherein the high-refractive-index particles have a refractive index of 2 to 4.

<8> A radiative cooling structure body including the polyolefin film according to any one of <1> to <7>.

An embodiment of the present disclosure provides a polyolefin film that has a strong radiative cooling effect.

Another embodiment of the present disclosure provides a radiative cooling structure body that has a strong radiative cooling effect.

DESCRIPTION OF THE PREFERRED EMBODIMENTS

Figure 1:
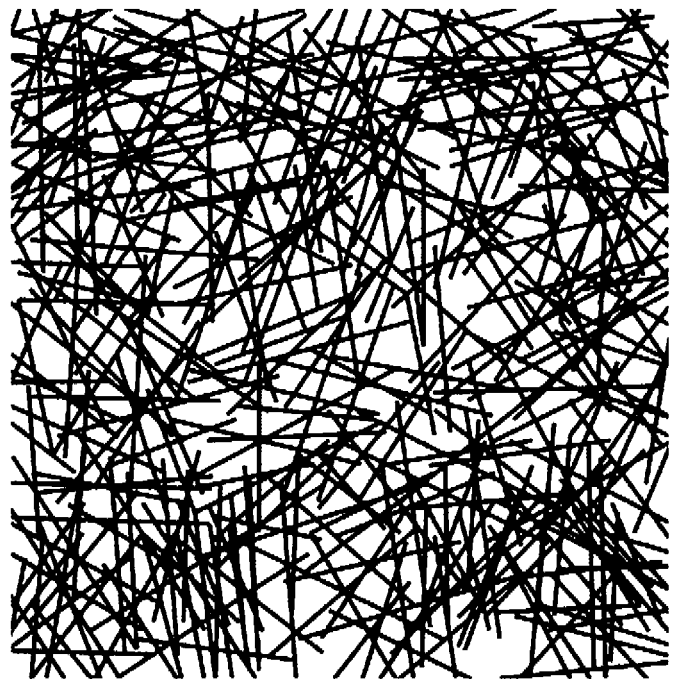
FIG. 1 is a schematic enlarged view of a connected-void structure in the polyolefin film of Example 3.

Hereinafter, embodiments according to the present disclosure will be described in detail. Note that the present disclosure is not limited to the following embodiments at all, and the embodiments can be appropriately modified and carried out within the spirit and scope of the present disclosure.

In the present disclosure, numerical ranges defined by "a value 'to' another value" include the value and the other value respectively as the lower limit value and the upper limit value. In the present disclosure, among numerical ranges described in series, the upper limit value or the lower limit value of a numerical range may be replaced by the upper limit value or the lower limit value of one of other numerical ranges described in series. In the present disclosure, among numerical ranges, the upper limit value or the lower limit value of a numerical range may be replaced by a value described in Examples.

In the present disclosure, the amount of each of components in a composition means, when the composition contains a plurality of substances belonging to such a component, the total amount of the plurality of substances in the composition unless otherwise specified.

In the present disclosure, a combination of two or more preferred embodiments is a more preferred embodiment.

Polyolefin Film

A polyolefin film according to the present disclosure includes a fibrous polyolefin having an average diameter of 0.1 μm or more and less than 1.0 μm, has a connected-void structure, has a void ratio a of 50% to 90%, and has a thickness d in μm, which satisfies, together with the void ratio a, the relation of $40 \leq (d \times (100-a)/100) \leq 200$. The polyolefin film according to the present disclosure includes the above-described features, to thereby have a strong radiative cooling effect.

The reason why the polyolefin film according to the present disclosure exerts the above-described effect is not clarified, but is inferred as follows.

The polyolefin film according to the present disclosure includes a fibrous polyolefin having an average diameter of 0.1 µm or more and less than 1.0 µm, has a connected-void structure, has a void ratio a of 50% to 90%, and has a thickness d in µm, which satisfies, together with the void ratio a, the relation of $40 \leq (d \times (100-a)/100) \leq 200$, to thereby strengthen the interaction with sunlight (electromagnetic waves reaching the surface of the earth from the sun) and to weaken the interaction with infrared rays. As a result, the polyolefin film according to the present disclosure suppresses transmission of sunlight and efficiently transmits infrared rays, which inferentially provides exertion of a strong radiative cooling effect.

The polyolefin film according to the present disclosure is, from the viewpoint of increasing the sunlight blocking ratio and the infrared transmittance, preferably a polyethylene film.

Hereinafter, elements of the polyolefin film according to the present disclosure will be described.

Fibrous Polyolefin

The polyolefin film according to the present disclosure includes a fibrous polyolefin having an average diameter of 0.1 µm or more and less than 1.0 µm. The polyolefin film according to the present disclosure includes the fibrous polyolefin, to thereby increase the sunlight blocking ratio and the infrared transmittance, to achieve improvement in the radiative cooling effect.

The polyolefin film according to the present disclosure may include a single fibrous polyolefin alone, or may include two or more fibrous polyolefins.

Polyolefin

The polyolefin of the fibrous polyolefin is not limited, and publicly known polyolefins are usable. The polyolefin may be a homopolymer or a copolymer.

Examples of the polyolefin include polyethylene, polypropylene, polynorbornene, and polystyrene.

The fibrous polyolefin is, from the viewpoint of increasing the sunlight blocking ratio and the infrared transmittance, preferably a fibrous polyethylene.

Average Diameter

The fibrous polyolefin has an average diameter of 0.1 µm or more and less than 1.0 µm. The fibrous polyolefin has an average diameter of 0.1 µm or more, to thereby strengthen the interaction with sunlight, to achieve an increase in the sunlight blocking ratio. The fibrous polyolefin has an average diameter of less than 1.0 µm, to thereby weaken the interaction with infrared rays, to achieve an increase in the infrared transmittance.

The average diameter of the fibrous polyolefin is, from the viewpoint of increasing the sunlight blocking ratio, preferably 0.15 µm or more, more preferably 0.2 µm or more, particularly preferably 0.25 µm or more.

The average diameter of the fibrous polyolefin is, from the viewpoint of increasing the infrared transmittance, preferably 0.8 µm or less, more preferably 0.6 µm or less, particularly preferably 0.4 µm or less.

The average diameter of the fibrous polyolefin is determined in the following manner: a scanning electron microscope (SEM) is used to obtain an observation image of a section of the polyolefin film; in the image, the diameters of 100 polyolefin fibers are measured; subsequently, the measured values are arithmetically averaged.

Average Length

The fibrous polyolefin has an average length of, from the viewpoint of increasing the sunlight blocking ratio and the infrared transmittance, preferably 2 µm to 30 µm, more preferably 4 µm to 20 µm, still more preferably 4 µm to 15 µm, particularly preferably 4 µm to 10 µm.

The average length of the fibrous polyolefin is determined in the following manner: a scanning electron microscope (SEM) is used to obtain an observation image of a section of the polyolefin film; in the image, the lengths of 100 polyolefin fibers (limited to polyolefin fibers whose both ends are observable) are measured; subsequently, the measured values are arithmetically averaged.

Volume Ratio

The volume ratio of the fibrous polyolefin is, from the viewpoint of increasing the sunlight blocking ratio and the infrared transmittance, relative to the total volume of the polyolefin film, preferably 50 vol % or more, more preferably 60 vol % or more, particularly preferably 70 vol % or more. The upper limit of the volume ratio of the fibrous polyolefin is not limited, and can be appropriately set in the range of 100 vol % or less.

Of the fibrous polyolefin included in the polyolefin film according to the present disclosure, polyolefin fibers having a diameter of 2 µm or more tend to exert a stronger interaction with infrared rays. For this reason, the volume ratio of the polyolefin fibers having a diameter of 2 µm or more relative to the total volume of the polyolefin film is preferably low. Of the fibrous polyolefin, the volume ratio of the polyolefin fibers having a diameter of 2 µm or more relative to the total volume of the polyolefin film is preferably 10 vol % or less, more preferably 2 vol % or less, particularly preferably 1 vol % or less. The volume ratio of the polyolefin fibers having a diameter of 2 µm or more can be 10 vol % or less, to thereby achieve an increase in the infrared transmittance. In the present disclosure, the diameter of each polyolefin fiber is determined by measuring a diameter at a single randomly selected position.

The lower limit of the volume ratio of the polyolefin fibers having a diameter of 2 µm or more is not limited from the viewpoint of increasing the infrared transmittance, and can be appropriately set in the range of, relative to the total volume of the polyolefin film, 0 vol % or more.

High-Refractive-Index Particles

The polyolefin film according to the present disclosure preferably includes high-refractive-index particles. The polyolefin film according to the present disclosure can include high-refractive-index particles, to thereby exert a stronger radiative cooling effect (in particular, the sunlight blocking ratio).

The high-refractive-index particles are particles having a high refractive index. The high-refractive-index particles are, from the viewpoint of having a high refractive index and having a low absorbance for sunlight etc., preferably inorganic particles. Examples of the inorganic particles include zinc oxide (ZnO) particles and zinc sulfide (ZnS) particles. The high-refractive-index particles are preferably zinc oxide particles or zinc sulfide particles.

The high-refractive-index particles have a refractive index of, from the viewpoint of strengthening the radiative cooling effect (in particular, the sunlight blocking ratio), preferably 1.5 to 5, more preferably 2 to 4, still more preferably 2 to 3.5, particularly preferably 2.5 to 3.5. The refractive index is a value measured using an ellipsometer.

The high-refractive-index particles have an average diameter of, from the viewpoint of strengthening the radiative cooling effect (in particular, the sunlight blocking ratio), preferably 50 nm to 1,000 nm, more preferably 100 nm to 800 nm. The average diameter of the high-refractive-index particles is determined in the following manner: a scanning electron microscope (SEM) is used to obtain an observation image of a section of the polyolefin film; in the image, the diameters of 100 high-refractive-index particles (lengths of, of the line segments connecting randomly selected two points on the contours of high-refractive-index particles, the longest line segments) are measured; subsequently, the measured values are arithmetically averaged.

The polyolefin film according to the present disclosure may include a single species of high-refractive-index particles alone, or may include two or more species of high-refractive-index particles.

When the polyolefin film according to the present disclosure includes high-refractive-index particles, the volume ratio of the high-refractive-index particles is, from the viewpoint of strengthening the radiative cooling effect (in particular, the sunlight blocking ratio), relative to the total volume of the polyolefin film, preferably 1 vol % to 20 vol %, preferably 3 vol % to 10 vol %.

Connected-Void Structure

The polyolefin film according to the present disclosure has a connected-void structure. The polyolefin film according to the present disclosure has a connected-void structure, to thereby achieve an increase in the sunlight blocking ratio and an increase in the infrared transmittance.

In the present disclosure, "connected-void structure" means a structure in which, within the film, a plurality of voids are connected together, in other words, a structure in which voids are continuously connected together three-dimensionally within the film (what are called, connected voids). The connected-void structure is ordinarily defined using the solid component (mainly the fibrous polyolefin) of the polyolefin film.

The connected-void structure will be described with reference to a drawing. However, the connected-void structure in the present disclosure is not limited to the drawing.

FIG. 1 is a schematic enlarged view of a connected-void structure in the polyolefin film of Example 3 described later. In FIG. 1, the areas illustrated in black represent polyolefin fibers. In FIG. 1, the areas illustrated in white represent voids.

As illustrated in FIG. 1, voids (white areas in FIG. 1) are formed between the polyolefin fibers (black areas). In the polyolefin film according to the present disclosure, for example, the structure illustrated in FIG. 1 forms a three-dimensional structure, to thereby form continuous voids, namely the connected-void structure.

Void Ratio a

The polyolefin film according to the present disclosure has a void ratio a of 50% to 90%. When the void ratio a is 50% or more, the polymer component (for example, a polyolefin) exhibits a lowered absorbance for infrared rays to thereby achieve an increase in the infrared transmittance, and exhibits an increased reflectance for sunlight to thereby achieve an increase in the sunlight blocking ratio. When the void ratio a is 90% or less, an increase in the mechanical strength is also achieved.

The void ratio a is, from the viewpoint of increasing the sunlight blocking ratio and the infrared transmittance, preferably 60% or more, more preferably 70% or more, particularly preferably 75% or more.

The void ratio a is, from the viewpoint of increasing the sunlight blocking ratio and the mechanical strength, preferably 85% or less, more preferably 80% or less.

The void ratio a is measured in the following manner. A scanning electron microscope (SEM) is used to obtain an observation image of a section of the polyolefin film; in the image, the area fraction of portions of the component forming the polyolefin film and the area fraction of portions of the voids are calculated; and the area ratio of portions of the voids (specifically, the ratio of the area of portions of the voids to the sum of the area of portions of the component forming the polyolefin film and the area of portions of the voids) is determined as the void ratio.

Thickness d

The polyolefin film according to the present disclosure has a thickness d of, from the viewpoint of increasing the sunlight blocking ratio and the mechanical strength, preferably 100 µm to 800 µm, more preferably 150 µm to 500 µm, still more preferably 150 µm to 300 µm, particularly preferably 150 µm to 250 µm. The thickness d is the arithmetic average of thicknesses at 100 points measured during observation of a section. The observation of a section is performed using a publicly known measurement apparatus (for example, a scanning electron microscope (SEM) or a transmission electron microscope (TEM)).

Relation Between Void Ratio a and Thickness d

In the polyolefin film according to the present disclosure, the thickness d in µm and the void ratio a in % satisfy the relation of $40 \leq (d \times (100-a)/100) \leq 200$ where "$d \times (100-a)$" represents the filling amount, in the thickness direction, of the solid components (for example, polyolefin fibers and high-refractive-index particles). When "$(d \times (100-a)/100)$" is 40 or more, the interaction with sunlight is strengthened, to thereby achieve an increase in the sunlight blocking ratio. When "$(d \times (100-a)/100)$" is 200 or less, the interaction with infrared rays is weakened, to thereby achieve an increase in the infrared transmittance.

The thickness d in µm and the void ratio a preferably satisfy the relation of $40 \leq (d \times (100-a)/100) \leq 200$, more preferably satisfy the relation of $50 \leq (d \times (100-a)/100) \leq 180$, particularly preferably satisfy the relation of $60 \leq (d \times (100-a)/100) \leq 150$. When "$(d \times (100-a)/100)$" is in such a range, the sunlight blocking ratio and the infrared transmittance are further increased.

Sunlight Blocking Ratio

The polyolefin film according to the present disclosure preferably has a sunlight blocking ratio of 92% or more, more preferably 94% or more, particularly preferably 96% or more. When the sunlight blocking ratio is 92% or more, the radiative cooling effect is improved. The upper limit of the sunlight blocking ratio is not limited, and can be appropriately set in the range of 100% or less.

The sunlight blocking ratio is measured in the following manner. In accordance with a method described in JIS A 5759:2008, an integrating-sphere spectrophotometer (for example, V-670, manufactured by JASCO Corporation) is used to measure the diffuse transmittance (%) of the polyolefin film at wavelengths of 300 nm to 2,500 nm. From 100%, the measured value (diffuse transmittance) is subtracted to provide a value (100%–diffuse transmittance %) defined as the sunlight blocking ratio.

Infrared Transmittance

The polyolefin film according to the present disclosure preferably has an infrared transmittance of 80% or more, more preferably 85% or more, particularly preferably 90% or more. When the infrared transmittance is 80% or more, the radiative cooling effect is improved. The upper limit of the infrared transmittance is not limited, and can be appropriately set in the range of 100% or less.

The infrared transmittance is measured in the following manner. A Fourier transform infrared spectrophotometer (for example, VIR-100, manufactured by JASCO Corporation) and an integrating-sphere unit are used to measure, at wavelengths of 5 µm to 25 µm, the spectroscopic infrared diffuse reflectance and the spectroscopic infrared diffuse transmittance of the polyolefin film. To the obtained spectroscopic infrared diffuse transmittance, the weight of the intensity of black-body radiation at 25° C. is assigned, and the resultant value is defined as the infrared transmittance.

Layer Structure

The structure of the polyolefin film according to the present disclosure may be a monolayer structure or may be a laminate structure. The polyolefin film according to the present disclosure may further include, as needed, another layer. Examples of the other layer include an ultraviolet absorption layer and a hard coat layer.

Production Method

A method for producing the polyolefin film according to the present disclosure is not limited, and publicly known methods are applicable. The method for producing the polyolefin film according to the present disclosure is, for example, a wet method or a dry method.

The wet method is a method using thermally induced phase separation. For example, a polymer (specifically a polyolefin) and a solvent are mixed at a high temperature to be separated into two phases, and subsequently the solvent is extracted to form the connected-void structure. As needed, the obtained film may be stretched.

The dry method is a method of extruding a polymer on a film, subsequently crystallizing the polymer by an annealing treatment, and subsequently performing stretching, to thereby form openings at crystal interfaces by the stretching stress.

In the wet method and the dry method, by changing the type of the polymer, the molecular weight of the polymer, the type of the solvent, the temperature during the process, the temperature during the stretching, and the stretching ratio, the shape and the void ratio of the connected-void structure in the polyolefin film can be controlled.

In the method for producing the polyolefin film according to the present disclosure, a publicly known method used for producing a separator used for a lithium ion battery is also applicable.

Applications

The polyolefin film according to the present disclosure is used as a radiative cooling film. For example, the polyolefin film is used to cover the upper portion of a cooling-target article, to thereby cool the cooling-target article by the radiative cooling phenomenon. For example, the polyolefin film is used as a window member of a structure body having a desired shape, to thereby cool the inside of the structure body by the radiative cooling phenomenon.

Radiative Cooling Structure Body

A radiative cooling structure body according to the present disclosure has the above-described polyolefin film. The radiative cooling structure body according to the present disclosure has the above-described polyolefin film, to thereby have a strong radiative cooling effect.

The radiative cooling structure body according to the present disclosure will be described with reference to a drawing. However, the radiative cooling structure body according to the present disclosure is not limited to the drawing.

Figure 2:
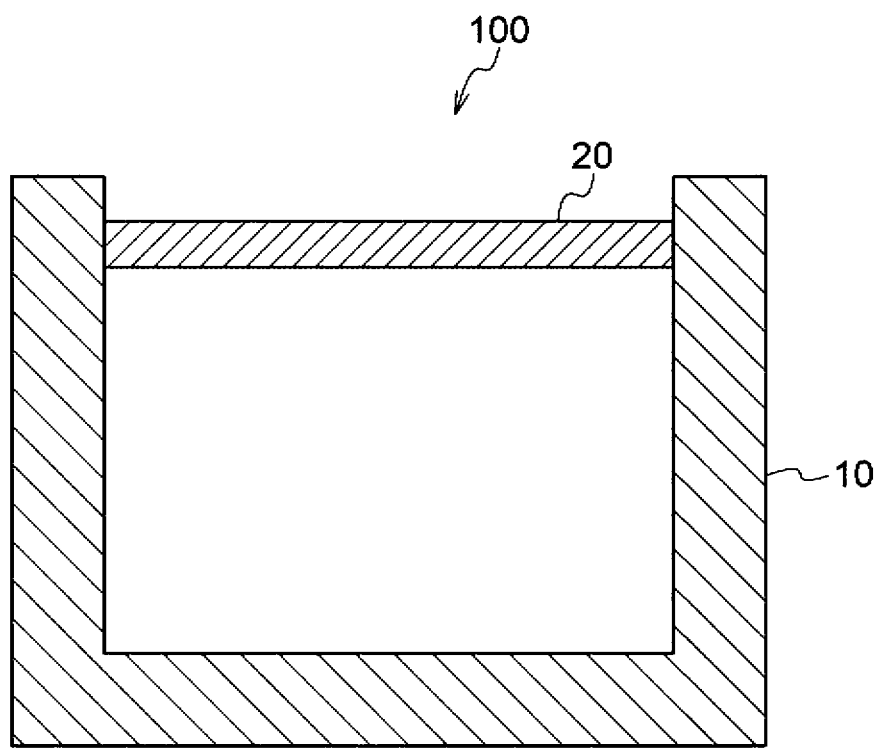
FIG. 2 is a schematic sectional view illustrating an example of a radiative cooling structure body according to the present disclosure.

FIG. 2 is a schematic sectional view illustrating an example of the radiative cooling structure body according to the present disclosure. In FIG. 2, a radiative cooling structure body 100 has a housing 10 and a polyolefin film 20.

The polyolefin film 20 is disposed at the opening portion of the housing 10. The polyolefin film 20 blocks sunlight coming toward the inside of the radiative cooling structure body 100 while it transmits infrared rays radiated from the inside to the outside of the radiative cooling structure body 100. As a result, the inside of the radiative cooling structure body 100 is cooled by the radiative cooling effect.

The shape and the size of the radiative cooling structure body are not limited, and can be appropriately set in accordance with the purpose. The shape of the radiative cooling structure body is, for example, a box shape.

Hereinafter, elements of the radiative cooling structure body according to the present disclosure will be described.

Polyolefin Film

As the polyolefin film in the radiative cooling structure body according to the present disclosure, the polyolefin film described under the above-described heading "Polyolefin film" is usable. Preferred embodiments of the polyolefin film in the radiative cooling structure body according to the present disclosure are the same as those described under the above-described heading "Polyolefin film".

The radiative cooling structure body according to the present disclosure has the polyolefin film, from the viewpoint of improving the radiative cooling effect, preferably at such a position that infrared rays are radiated via the polyolefin film from the inside to the outside of the radiative cooling structure body. Specifically, the radiative cooling structure body according to the present disclosure has the polyolefin film preferably at a position where the polyolefin film is intersected by the incident direction of sunlight, more preferably has the polyolefin film in a portion of or the entirety of the region of a member (also referred to as a roof) covering the upper portion of the radiative cooling structure body, particularly preferably has the polyolefin film as a skylight. The phrase "intersected by the incident direction of sunlight" means that, during at least a portion of hours of sunlight, the incident direction of sunlight and the boundary surface of the polyolefin film (specifically, the surface of the polyolefin film) intersect. Note that the incidence angle of sunlight to the polyolefin film is not limited. The term "skylight" means a window disposed in a portion of a member covering the upper portion of the radiative cooling structure body.

The polyolefin film may be disposed in a flat form, may be disposed in a curved form (specifically, in a form having a curved surface), or may be disposed in a bent form.

The shape of the polyolefin film is not limited and can be appropriately set in accordance with the purpose. Examples of the shape of the polyolefin film in plan view include triangular shapes, quadrangular shapes, other polygonal shapes including pentagonal shapes, circular shapes, and amorphous shapes.

The radiative cooling structure body according to the present disclosure may have a single polyolefin film, or may have two or more polyolefin films.

Housing

The radiative cooling structure body according to the present disclosure preferably has a housing. The radiative cooling structure body according to the present disclosure can have a housing, to thereby achieve improvement in the radiative cooling effect and the strength.

The housing may be formed of a single member, or may be formed of a combination of a plurality of members. Examples of the material for the housing include polypropylene and polystyrene.

The material for the housing is, from the viewpoint of heat insulating properties, preferably a heat insulating material. Examples of the heat insulating material include polystyrene foam and polyurethane foam. The heat insulating material is preferably polystyrene foam.

The housing preferably has, from the viewpoint of improving the radiative cooling effect, an opening portion at least in the upper portion. When the housing has an opening portion, the polyolefin film may be disposed at the opening portion.

The number of such opening portions is not limited, and may be one or may be two or more. For example, the number of opening portions can be appropriately set in accordance with the intended radiative cooling effect.

The shape of the opening portion is not limited, and examples include triangular shapes, quadrangular shapes, other polygonal shapes including pentagonal shapes, circular shapes, and amorphous shapes.

The housing preferably has therein a space portion. When the housing has therein a space portion, for example, a cooling-target article may be disposed in the space portion of the housing, so that the radiative cooling effect causes cooling of the cooling-target article. When the housing has the opening portion and the space portion, the opening portion and the space portion are preferably connected to each other.

The shape and the size of the housing are not limited, and can be appropriately set in accordance with the purpose. Examples of the shape of the housing in plan view include triangular shapes, quadrangular shapes, other polygonal shapes including pentagonal shapes, circular shapes, and amorphous shapes.

EXAMPLES

Hereinafter, the present disclosure will be described in detail with reference to Examples. However, the present disclosure is not limited to the following Examples.

Examples 1 to 10 and Comparative Examples 1 to 32

Sunlight Blocking Ratio and Infrared Transmittance

A simulation using the FDTD method (Finite-difference time-domain method) was performed, to analyze the sunlight blocking ratios and the infrared light transmittances of polyolefin films. Specifically, the method was as follows.

As the models of the polyolefin films, structures in which fibrous polyolefins were randomly dispersed in a medium having a refractive index of 1.0 (air) were formed. The features of the polyolefin films (such as the average diameters of the fibrous polyolefins) were determined in accordance with descriptions in Table 1-1. A schematic enlarged view of a connected-void structure in the polyolefin film of Example 3 is illustrated in FIG. 1. The polyolefin films each had a connected-void structure as illustrated in FIG. 1.

In the FDTD method, as the boundary conditions in the X-axis direction and in the Y-axis direction, periodic boundary conditions were applied. As the boundary condition in the Z-axis direction, a perfect absorbing boundary condition was applied. The electromagnetic field in a region of 30 μm (along the X axis)×30 μm (along the Y axis)×10 μm (along the Z axis) was calculated. From the calculation, scattering coefficients and absorption coefficients at wavelengths were determined. On the basis of the determined scattering coefficients and absorption coefficients, the Monte Carlo method was used to calculate transmittances, reflectances, and absorbances at wavelengths of the polyolefin films.

To the determined transmittances at wavelengths, weights were assigned using "pre-calculated weighting functions for calculation of solar transmittance and solar reflectance" described in JIS A 5759:2008, to calculate sunlight transmittances (%). From 100%, such a sunlight transmittance was subtracted, to thereby calculate the sunlight blocking ratio (%). The sunlight blocking ratios of the polyolefin films will be described in Table 1-2.

To the determined transmittances at 5 μm to 25 μm, the weight of the intensity of black-body radiation at 25° C. was assigned, to thereby calculate infrared transmittances (%). The infrared transmittances of the polyolefin films will be described in Table 1-2.

Radiative Cooling Power

The radiative cooling powers of the polyolefin films used for analysis of the sunlight blocking ratios and the infrared transmittances were evaluated. Specifically, the method was as follows.

In accordance with Formula (1) described in "Nature, Volume 515, pages 540-544", the radiative cooling powers of the polyolefin films in average daytime weather conditions in the Tokyo region in July of 2018 were calculated. The radiative cooling powers of the polyolefin films will be described in Table 1-2. In Table 1-2, in the "Radiative cooling power" column, positive values represent occurrence of radiative cooling while negative values represent occurrence of heating (increase in the temperature).

Radiative Cooling Effect

On the basis of the determined radiative cooling powers, in accordance with the following grades, the radiative cooling effects were evaluated. The evaluation results will be described in Table 1-2.

Grades

A: the radiative cooling power is 20 W/m$^2$ or more.

B: the radiative cooling power is 0 W/m$^2$ or more and less than 20 W/m$^2$.

C: the radiative cooling power is less than 0 W/m$^2$ (namely, a negative value).

Examples 11 to 19 and Comparative Examples 33 to 34

The same method as in Example 1 was performed except that the features of polyolefin films were changed in accordance with the descriptions in Table 2, to analyze the sunlight blocking ratios and the infrared light transmittances of the polyolefin films. The results will be described in Table 2.

Examples 20 to 23

The same method as in Example 5 was performed except that, in Example 5, high-refractive-index particles selected in accordance with the descriptions in Table 3 were further added, to analyze the sunlight blocking ratios and the infrared light transmittances of the polyolefin films. The results will be described in Table 3. Note that ZnO described in Table 3 has a refractive index of 2.0. ZnS described in Table 3 has a refractive index of 2.5.

TABLE 1-1

| | Fibrous polyolefin | | | | |
|---|---|---|---|---|---|
| | Average diameter [μm] | Average length [μm] | Void ratio a | Thickness d [μm] | Volume ratio of polyolefin fibers having diameter of 2 μm or more |
| Comparative Example 1 | 0.05 | 8 | 86% | 200 | <1% |
| Comparative Example 2 | 0.05 | 8 | 76% | 200 | <1% |
| Comparative Example 3 | 0.05 | 8 | 63% | 200 | <1% |
| Comparative Example 4 | 0.05 | 8 | 43% | 200 | <1% |
| Comparative Example 5 | 0.05 | 8 | 27% | 200 | <1% |
| Comparative Example 6 | 0.05 | 8 | 7% | 200 | <1% |
| Comparative Example 7 | 0.1 | 8 | 89% | 200 | <1% |
| Example 1 | 0.1 | 8 | 80% | 200 | <1% |
| Example 2 | 0.1 | 8 | 75% | 200 | <1% |
| Example 3 | 0.1 | 8 | 53% | 200 | <1% |
| Comparative Example 8 | 0.1 | 8 | 41% | 200 | <1% |
| Comparative Example 9 | 0.1 | 8 | 12% | 200 | <1% |
| Comparative Example 10 | 0.25 | 8 | 89% | 200 | <1% |
| Example 4 | 0.25 | 8 | 79% | 200 | <1% |
| Example 5 | 0.25 | 8 | 77% | 200 | <1% |
| Example 6 | 0.25 | 8 | 52% | 200 | <1% |
| Comparative Example 11 | 0.25 | 8 | 30% | 200 | <1% |
| Comparative Example 12 | 0.25 | 8 | 11% | 200 | <1% |
| Comparative Example 13 | 0.5 | 8 | 89% | 200 | <1% |
| Example 7 | 0.5 | 8 | 80% | 200 | <1% |
| Example 8 | 0.5 | 8 | 65% | 200 | <1% |
| Comparative Example 14 | 0.5 | 8 | 28% | 200 | <1% |
| Comparative Example 15 | 0.5 | 8 | 12% | 200 | <1% |
| Comparative Example 16 | 0.5 | 8 | 4% | 200 | <1% |
| Comparative Example 17 | 0.8 | 8 | 90% | 200 | <1% |
| Example 9 | 0.8 | 8 | 78% | 200 | <1% |
| Example 10 | 0.8 | 8 | 63% | 200 | 2% |
| Comparative Example 18 | 0.8 | 8 | 35% | 200 | 3% |
| Comparative Example 19 | 0.8 | 8 | 16% | 200 | 5% |
| Comparative Example 20 | 0.8 | 8 | 11% | 200 | 8% |
| Comparative Example 21 | 1 | 8 | 88% | 200 | <1% |
| Comparative Example 22 | 1 | 8 | 77% | 200 | 2% |
| Comparative Example 23 | 1 | 8 | 64% | 200 | 5% |
| Comparative Example 24 | 1 | 8 | 43% | 200 | 8% |
| Comparative Example 25 | 1 | 8 | 21% | 200 | 11% |
| Comparative Example 26 | 1 | 8 | 10% | 200 | 19% |
| Comparative Example 27 | 2 | 8 | 83% | 200 | 11% |
| Comparative Example 28 | 2 | 8 | 71% | 200 | 20% |
| Comparative Example 29 | 2 | 8 | 51% | 200 | 35% |
| Comparative Example 30 | 2 | 8 | 33% | 200 | 42% |
| Comparative Example 31 | 2 | 8 | 13% | 200 | 68% |
| Comparative Example 32 | 2 | 8 | 1% | 200 | 78% |

TABLE 1-2

| | d × (100 − a)/100 | Sunlight blocking ratio | Infrared transmittance | Radiative cooling power [W/m$^2$] | Radiative cooling effect |
|---|---|---|---|---|---|
| Comparative Example 1 | 28 | 86% | 96% | −54.1 | C |
| Comparative Example 2 | 49 | 89% | 92% | −18.3 | C |
| Comparative Example 3 | 74 | 90% | 89% | −11.4 | C |
| Comparative Example 4 | 114 | 90% | 87% | −15.3 | C |
| Comparative Example 5 | 146 | 90% | 82% | −27.6 | C |
| Comparative Example 6 | 187 | 87% | 77% | −67.4 | C |
| Comparative Example 7 | 22 | 86% | 96% | −53.7 | C |
| Example 1 | 40 | 93% | 95% | 29.8 | A |
| Example 2 | 50 | 94% | 94% | 44.6 | A |
| Example 3 | 94 | 94% | 85% | 35.9 | A |
| Comparative Example 8 | 118 | 91% | 81% | −7.6 | C |
| Comparative Example 9 | 176 | 85% | 75% | −95.7 | C |
| Comparative Example 10 | 22 | 92% | 95% | 17.7 | B |
| Example 4 | 42 | 95% | 94% | 53.2 | A |
| Example 5 | 46 | 96% | 93% | 62.9 | A |
| Example 6 | 96 | 95% | 84% | 49.6 | A |
| Comparative Example 11 | 140 | 93% | 76% | 14.2 | B |
| Comparative Example 12 | 178 | 89% | 74% | −50.2 | C |
| Comparative Example 13 | 22 | 91% | 92% | −0.1 | C |
| Example 7 | 40 | 94% | 87% | 35.8 | A |
| Example 8 | 70 | 95% | 84% | 48.0 | A |

TABLE 1-2-continued

|  | d × (100 − a)/100 | Sunlight blocking ratio | Infrared transmittance | Radiative cooling power [W/m²] | Radiative cooling effect |
|---|---|---|---|---|---|
| Comparative Example 14 | 144 | 94% | 76% | 18.8 | B |
| Comparative Example 15 | 176 | 91% | 72% | −20.9 | C |
| Comparative Example 16 | 192 | 84% | 71% | −113.6 | C |
| Comparative Example 17 | 20 | 91% | 85% | −9.1 | C |
| Example 9 | 44 | 94% | 82% | 34.8 | A |
| Example 10 | 74 | 95% | 80% | 34.0 | A |
| Comparative Example 18 | 130 | 94% | 71% | 18.6 | B |
| Comparative Example 19 | 168 | 92% | 70% | −16.5 | C |
| Comparative Example 20 | 178 | 85% | 71% | −107.9 | C |
| Comparative Example 21 | 24 | 91% | 78% | −18.1 | C |
| Comparative Example 22 | 46 | 93% | 73% | 2.5 | B |
| Comparative Example 23 | 72 | 94% | 68% | 9.1 | B |
| Comparative Example 24 | 114 | 94% | 66% | 13.3 | B |
| Comparative Example 25 | 158 | 92% | 68% | −12.1 | C |
| Comparative Example 26 | 180 | 85% | 72% | −102.2 | C |
| Comparative Example 27 | 34 | 81% | 50% | −185.1 | C |
| Comparative Example 28 | 58 | 87% | 55% | −98.4 | C |
| Comparative Example 29 | 98 | 89% | 46% | −89.9 | C |
| Comparative Example 30 | 134 | 91% | 41% | −63.2 | C |
| Comparative Example 31 | 174 | 88% | 58% | −77.9 | C |
| Comparative Example 32 | 198 | 82% | 65% | −155.0 | C |

TABLE 2

| | Fibrous polyolefin | | | | | | | |
|---|---|---|---|---|---|---|---|---|
|  | Average diameter [μm] | Average length [μm] | Void ratio a | Thickness d [μm] | Volume ratio of polyolefin fibers having diameter of 2 μm or more | d × (100 − a)/100 | Sunlight blocking ratio | Infrared transmittance |
| Example 11 | 0.25 | 8 | 77% | 200 | <1% | 46 | 96% | 93% |
| Example 12 | 0.25 | 4 | 77% | 200 | <1% | 46 | 95% | 92% |
| Example 13 | 0.25 | 6 | 77% | 200 | <1% | 46 | 94% | 93% |
| Example 14 | 0.25 | 10 | 77% | 200 | <1% | 46 | 95% | 93% |
| Example 15 | 0.25 | 15 | 77% | 200 | <1% | 46 | 94% | 92% |
| Example 16 | 0.25 | 20 | 77% | 200 | <1% | 46 | 93% | 91% |
| Comparative Example 33 | 0.25 | 8 | 77% | 100 | <1% | 23 | 90% | 96% |
| Example 17 | 0.25 | 8 | 77% | 300 | <1% | 69 | 96% | 91% |
| Example 18 | 0.25 | 8 | 77% | 500 | <1% | 115 | 97% | 87% |
| Example 19 | 0.25 | 8 | 77% | 700 | <1% | 161 | 97% | 83% |
| Comparative Example 34 | 0.25 | 8 | 77% | 1000 | <1% | 230 | 98% | 76% |

TABLE 3

| | High-refractive-index particles | | | | | |
|---|---|---|---|---|---|---|
|  | Type | Shape | Average diameter [nm] | Volume ratio [%] | Sunlight blocking ratio | Infrared transmittance |
| Example 20 | ZnO | Spherical | 100 | 3 | 96% | 93% |
| Example 21 | ZnO | Spherical | 100 | 5 | 98% | 92% |
| Example 22 | ZnS | Spherical | 100 | 3 | 97% | 92% |
| Example 23 | ZnS | Spherical | 100 | 5 | 98% | 91% |

Tables 1-1 to 3 have demonstrated that Examples 1 to 23 have, compared with Comparative Examples 1 to 34, high sunlight blocking ratios and high infrared transmittances. In addition, Table 1-2 has demonstrated that Examples 1 to 10 also have, compared with Comparative Examples 1 to 32, high radiative cooling powers.

Table 3 has demonstrated that, in particular, Examples 20 to 23 (polyolefin films including high-refractive-index particles) have sunlight blocking ratios equal to or higher than the sunlight blocking ratio of Example 5 (polyolefin film not including high-refractive-index particles).

The above-described results have demonstrated that the polyolefin films of Examples 1 to 23 are suitably usable as radiative cooling films. The polyolefin films of Examples 1 to 23 are used as, for example, skylights of radiative cooling structure bodies, to thereby achieve efficient cooling of the inside of the radiative cooling structure bodies having housings.

The entire contents disclosed by JP2019-120250 filed in the Japan Patent Office on Jun. 27, 2019 are incorporated herein by reference. All the documents, patent applications, and technical standards mentioned in this Specification are incorporated herein by reference to the same extent as in the case where the documents, patent applications, and technical standards are each specifically and individually described as being incorporated herein by reference.

What is claimed is:
1. A polyolefin film comprising a fibrous polyolefin having an average diameter of 0.1 μm or more and less than 1.0 μm,
wherein the polyolefin film has a connected-void structure,
has a void ratio a of 50% to 90%, has a thickness d in μm, which satisfies, together with the void ratio a, a relation of 40≤(d×(100−a)/100)≤200, and is used as a radiative cooling film.

2. The polyolefin film according to claim 1, wherein, of the fibrous polyolefin, polyolefin fibers having a diameter of 2 μm or more have a volume ratio of, relative to a total volume of the polyolefin film, 10 vol % or less.

3. The polyolefin film according to claim 1, having a sunlight blocking ratio of 92% or more.

4. The polyolefin film according to claim 1, having an infrared transmittance of 80% or more.

5. The polyolefin film according to claim 1, being a polyethylene film.

6. The polyolefin film according to claim 1, comprising high-refractive-index particles.

7. The polyolefin film according to claim 6, wherein the high-refractive-index particles have a refractive index of 2 to 4.

8. A radiative cooling structure body comprising the polyolefin film according to claim 1.

* * * * *